United States Patent
Otsuka

(10) Patent No.: US 10,629,910 B2
(45) Date of Patent: Apr. 21, 2020

(54) FLOW BATTERY THAT INCLUDES REDOX MEDIATOR

(71) Applicant: Panasonic Intellectual Property Management Co., Ltd., Osaka (JP)

(72) Inventor: Yu Otsuka, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 146 days.

(21) Appl. No.: 16/010,164

(22) Filed: Jun. 15, 2018

(65) Prior Publication Data

US 2019/0020031 A1    Jan. 17, 2019

(30) Foreign Application Priority Data

Jul. 13, 2017   (JP) .................. 2017-137308

(51) Int. Cl.
```
H01M 4/60        (2006.01)
H01M 8/18        (2006.01)
H01M 4/36        (2006.01)
H01M 8/04082     (2016.01)
H01M 8/04186     (2016.01)
H01M 4/90        (2006.01)
```
(52) U.S. Cl.
CPC ............. *H01M 4/60* (2013.01); *H01M 4/368* (2013.01); *H01M 4/9091* (2013.01); *H01M 8/04186* (2013.01); *H01M 8/04201* (2013.01); *H01M 8/188* (2013.01)

(58) Field of Classification Search
None
See application file for complete search history.

(56) References Cited

U.S. PATENT DOCUMENTS

| | | | |
|---|---|---|---|
| 2009/0094822 A1* | 4/2009 | Ohtsuka | H01M 10/0427 29/623.1 |
| 2014/0178735 A1 | 6/2014 | Wang et al. | |
| 2017/0179525 A1 | 6/2017 | Haeupler et al. | |
| 2018/0048004 A1* | 2/2018 | Hojo | H01M 8/18 |

FOREIGN PATENT DOCUMENTS

| | | |
|---|---|---|
| JP | 2014-524124 | 9/2014 |
| JP | 2017-512871 | 5/2017 |
| WO | 2007/116926 | 10/2007 |
| WO | 2016/208123 | 12/2016 |

* cited by examiner

*Primary Examiner* — Wyatt P McConnell
(74) *Attorney, Agent, or Firm* — Renner, Otto, Boisselle & Sklar, LLP

(57) ABSTRACT

A flow battery includes: a liquid including a redox mediator; an electrode at least partially immersed in the liquid; a second electrode; an active material at least partially immersed in the liquid, and a circulator that circulates the liquid between the electrode and the active material.

12 Claims, 2 Drawing Sheets

2000

FLOW BATTERY THAT INCLUDES REDOX MEDIATOR

BACKGROUND

1. Technical Field

The present disclosure relates to a flow battery that includes redox mediator.

2. Description of the Related Art

Japanese Unexamined Patent Application Publication (Translation of PCT Application) No. 2014-524124 discloses a redox flow battery system that includes an energy storage containing a redox mediator.

International Publication No. WO 2016/208123 discloses a flow battery containing a redox species.

SUMMARY

There is a demand for a flow battery with a high discharge potential.

In one general aspect, the techniques disclosed here feature a flow battery that includes: a liquid including a redox mediator; an electrode at least partially immersed in the liquid; a second electrode; an active material at least partially immersed in the liquid, and a circulator that circulates the liquid between the electrode and the active material.

The present disclosure can provide a flow battery with a high discharge potential.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

When a mediator for use in a non-aqueous mediator-type flow battery used in a positive electrode, the mediator electrochemically oxidized on the positive electrode must have the ability to chemically oxidize a positive-electrode active material, and/or the mediator electrochemically reduced on the positive electrode must have the ability to chemically reduce a positive-electrode active material. When a mediator for use in a non-aqueous mediator-type flow battery is used in a negative electrode, the mediator electrochemically reduced on the negative electrode must have the ability to chemically reduce a negative-electrode active material, and/or the mediator electrochemically oxidized on the negative electrode must have the ability to chemically oxidize a negative-electrode active material. Even in the case of substances used as active materials in other secondary batteries, such as aqueous flow batteries, oxidized and/or reduced products thereof do not necessarily have the ability to oxidize and/or reduce active materials in non-aqueous mediator-type flow batteries, and the substances cannot be used as mediators in non-aqueous mediator-type flow batteries unless it is confirmed that they have the ability to oxidize and/or reduce the active materials in the non-aqueous mediator-type flow batteries. As a result of extensive studies, the present inventor has found a mediator that can oxidize and/or reduce an active material in a non-aqueous mediator-type flow battery. Embodiments of the present disclosure will be described below with reference to the accompanying drawings.

First Embodiment

Figure 1:
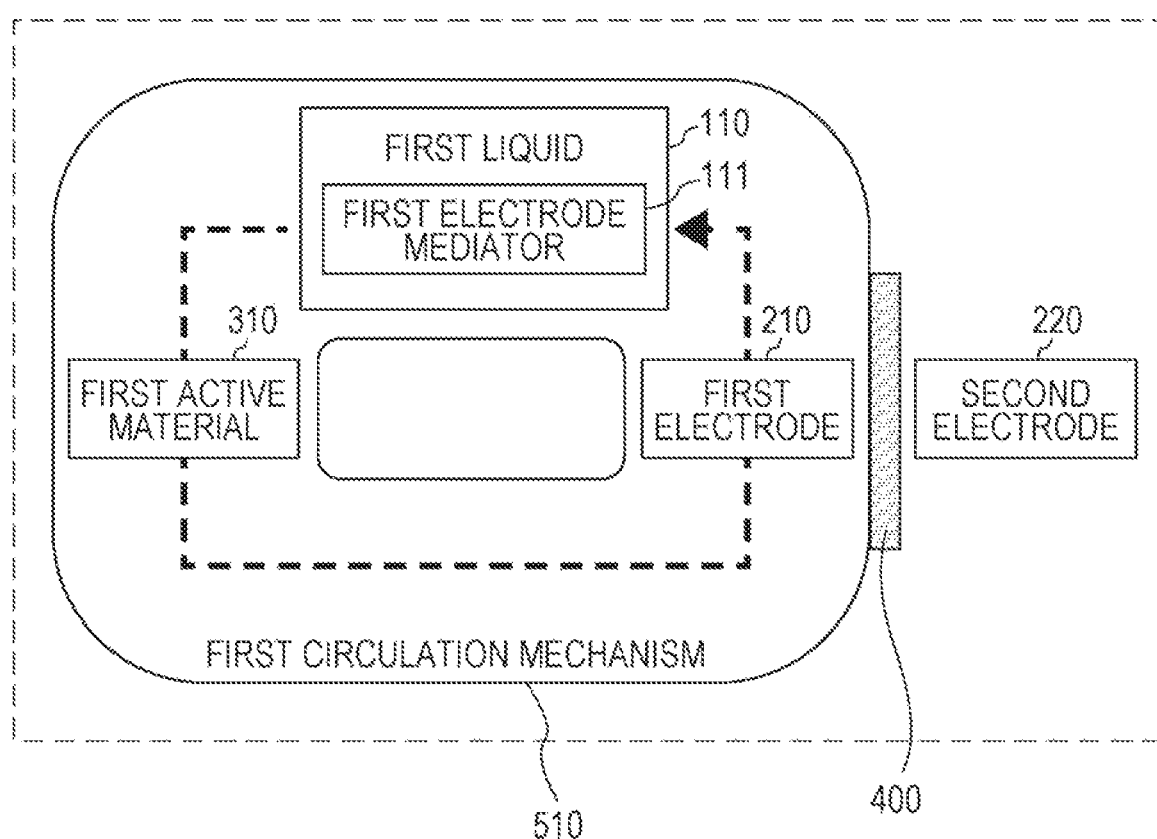
FIG. 1 is a schematic block diagram of a flow battery according to a first embodiment.

FIG. 1 is a schematic block diagram of a flow battery 1000 according to a first embodiment.

The flow battery 1000 according to the first embodiment includes a first liquid 110, a first electrode 210, a first active material 310, and a first circulation mechanism (an example of a circulator) 510.

The first liquid 110 contains a first electrode mediator (an example of a redox mediator) 111 dissolved therein.

The first electrode 210 is at least partially immersed in the first liquid 110.

The first active material 310 is at least partially immersed in the first liquid 110.

The first circulation mechanism 510 circulates the first liquid 110 between the first electrode 210 and the first active material 310.

The first electrode mediator 111 contains a compound represented by the following general formula (1) or a derivative thereof.

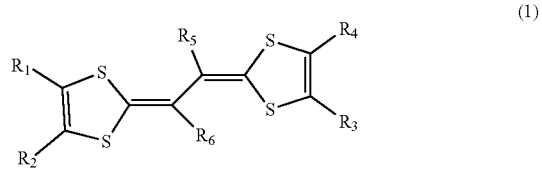

(1)

Such a structure can improve the discharge potential, energy density, and cycle life of a flow battery.

In such a structure, a compound represented by the general formula (1) or a derivative thereof can cause an electrochemical redox reaction. Having two 5-membered rings containing a sulfur element, one molecule of the fused-ring compound or derivative thereof can cause a two-step two-electron reaction. Furthermore, a carbon-carbon bond between the 5-membered rings containing a sulfur element can narrow the peak separation of the oxidation potential and the reduction potential in the two steps and thereby increase the energy efficiency as compared with the case where tetrathiafulvalenes are used as first electrode mediators as described in conventional technology.

Furthermore, such a structure can utilize an active material for a flow battery without circulating the active material. Thus, a high-capacity active material powder can be used as the first active material 310 in a charge-discharge reaction, for example. This can increase the energy density and capacity of a flow battery.

Such a structure can circulate only the first liquid 110 containing the first electrode mediator 111 dissolved therein without circulating an active material powder. This can reduce the occurrence of clogging of a pipe with the active material powder. Thus, the flow battery can have a long cycle life. A compound represented by the general formula (1) is a monomer, which has a lower molecular weight than oligomers or polymers, and is easily soluble in the first liquid 110 (for example, an electrolytic solution).

In the flow battery 1000 according to the first embodiment, $R_1$ to $R_6$ in a compound represented by the general formula (1) and a derivative thereof independently denote a hydrogen atom, a chain saturated hydrocarbon group, a chain unsaturated hydrocarbon group, a cyclic saturated hydrocarbon group, or a cyclic unsaturated hydrocarbon group. These hydrocarbon groups may have at least one selected from an oxygen atom, a nitrogen atom, a sulfur atom, and a silicon atom. In the present disclosure, the number of carbon atoms in the chain saturated hydrocarbon group or in unsaturated hydrocarbon group may be one or more.

Such a structure can increase the energy density of a flow battery.

In the flow battery 1000 according to the first embodiment, $R_1$, $R_2$, $R_3$, and $R_4$ in a compound represented by the general formula (1) may contain at least one electron-withdrawing group selected from the group consisting of a sulfur atom, a nitrogen atom, an oxygen atom, and a silicon atom. $R_5$ and $R_6$ may be a hydrogen atom or may have an aromatic group.

In such a structure, an electron-withdrawing atom can increase the discharge potential of a flow battery.

In the flow battery 1000 according to the first embodiment, $R_1$ and $R_2$ in a compound represented by the general formula (1) may independently denote a hydrocarbon group represented by $C_nH_{2n+1}$ (wherein n is an integer satisfying $1 \leq n \leq 4$). In the present disclosure, the number of carbon atoms in the chain saturated hydrocarbon group may range from 1 to 4. In the present disclosure, the number of carbon atoms in the chain unsaturated hydrocarbon group may be one or more.

Such a structure can increase the discharge potential of a flow battery. When $R_1$ to $R_6$ in a compound represented by the general formula (1) independently denote a hydrocarbon group having less than 5 carbon atoms (in particular, $R_1$ to $R_6$ independently denote a chain saturated hydrocarbon group), this can reduce the increase in melting point and the decrease in solubility. For example, when $R_1$ and $R_2$ in a compound represented by the general formula (1) independently denote —CH₃, —CH₂CH₃—, —CH₂CH₂CH₃, or —CH₂CH₂CH₂CH₃, this can reduce the decrease in solubility in the first liquid 110.

The compound represented by the general formula (1) may be a compound represented by the following general formula (2):

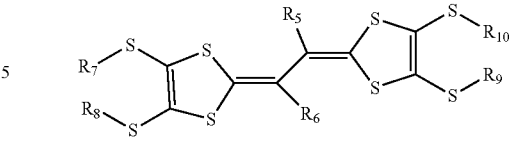

wherein $R_5$ and $R_6$ are described above, $R_7$ to $R_{10}$ independently denote a hydrogen atom, a chain saturated hydrocarbon group, a chain unsaturated hydrocarbon group, a cyclic saturated hydrocarbon group, or a cyclic unsaturated hydrocarbon group, and $R_5$ to $R_{10}$ may independently contain at least one selected from the group consisting of an oxygen atom, a nitrogen atom, a sulfur atom, and a silicon atom.

Such a structure can increase the energy density of a flow battery.

The compound represented by the general formula (1) may be a compound represented by the following formula (3).

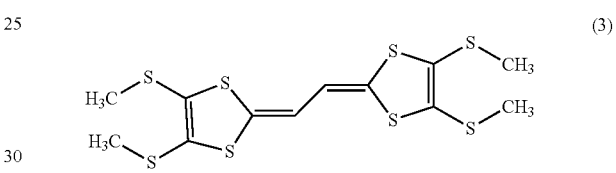

Such a structure can increase the energy density of a flow battery.

The compound represented by the general formula (1) may be a compound represented by the following formula (4).

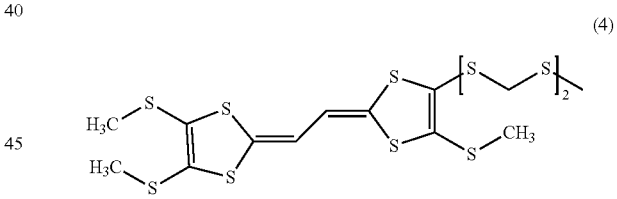

Such a structure can increase the energy density of a flow battery.

Table 1 lists the measured electric potentials of compounds represented by the general formula (1) usable as the first electrode mediator 111.

TABLE 1

| Compound | E1 (V vs. Li/Li⁺) | E2 (V vs. Li/Li⁺) |
|---|---|---|
| 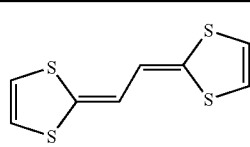 | 3.11 | 3.26 |

TABLE 1-continued

| Compound | E1 (V vs. Li/Li⁺) | E2 (V vs. Li/Li⁺) |
|---|---|---|
| [structure] | 3.25 | 3.44 |
| [structure] | 3.31 | 3.52 |

An electrolytic solution of 1 M electrolyte (LiBF$_4$) in a propylene carbonate solvent was prepared. 1 mM of each compound listed in Table 1 was dissolved in the electrolytic solution to prepare an electrolytic solution of the compound. An electrometric cell for each compound listed in Table 1 was fabricated from the electrolytic solution, a counter electrode, a working electrode, and a reference electrode. The counter electrode was a 1×1 cm² Pt mesh. The working electrode was a glassy carbon electrode for electrochemical measurement (φ6 mm). The reference electrode was a silver wire (Ag/Ag⁺). The electrometric cell was used to measure the charge-discharge potential of each compound listed in Table 1 by cyclic voltammetry (CV). Table 1 lists the measured charge-discharge potentials based on lithium metal (V vs. Li/Li⁺).

An oxidized product of a compound represented by the general formula (1) or a derivative thereof has aromaticity and causes a two-step redox reaction. Thus, a compound represented by the general formula (1) or a derivative thereof may be used alone as a charge-discharge mediator. The equilibrium potential of the first-step redox reaction (first redox potential: E1 (V vs. Li/Li⁺)) corresponds to the electric potential of the discharge mediator. The equilibrium potential of the second-step redox reaction (second redox potential: E2 (V vs. Li/Li⁺)) corresponds to the electric potential of the charge mediator.

The discharge potential of a flow battery depends on the electric potential of a positive-electrode discharge mediator. Thus, a compound represented by the general formula (1) according to the first embodiment with a higher discharge potential than tetrathiafulvalenes having no cyclic substituent can increase the discharge potential of a flow battery. Tetrathiafulvalenes have a discharge potential of approximately 3.2 V.

In the flow battery 1000 according to the first embodiment, the first electrode mediator 111 may contain a compound represented by the general formula (1) alone.

In the flow battery 1000 according to the first embodiment, the first electrode mediator 111 may contain two or more compounds represented by the general formula (1).

As described above, a compound represented by the general formula (1) according to the first embodiment has a first redox potential E1 and a second redox potential E2.

The first active material 310 may have an equilibrium potential (V vs. Li/Li⁺) higher than the first redox potential E1 and lower than the second redox potential E2.

In such a structure, the use of an active material with an equilibrium potential higher than the first redox potential E1 as the first active material 310 allows a compound represented by the general formula (1) according to the first embodiment to function as a discharge mediator. In other words, the use of an active material with an electric potential higher than the first redox potential E1 as the first active material 310 allows a compound represented by the general formula (1) according to the first embodiment to function as a discharge mediator.

The use of an active material with an equilibrium potential lower than the second redox potential E2 (with an electric potential lower than the second redox potential E2) as the first active material 310 allows a compound represented by the general formula (1) according to the first embodiment to function as a charge mediator. In other words, the use of an active material with an electric potential lower than the second redox potential E2 as the first active material 310 allows a compound represented by the general formula (1) according to the first embodiment to function as a charge mediator.

In the flow battery 1000 according to the first embodiment, the first active material 310 may be a metal oxide represented by Li$_x$M$_y$O$_2$. M denotes at least one selected from the group consisting of Ni, Mn, and Co. The variables x and y may be any number. The metal oxide has an equilibrium potential in the range of 3.2 to 3.8 V.

In the flow battery 1000 according to the first embodiment, the first active material 310 may be at least one selected from the group consisting of LiFePO$_4$, LiMnO$_2$, LiMn$_2$O$_4$, and LiCoO$_2$.

The first active material 310 may be a solid active material. The solid active material may be an active material powder. Storage of the first active material 310 as an unprocessed powder in a tank can simplify production and reduce production costs.

The first active material 310 may be active material pellets. The active material pellets may be formed by pelletizing an active material powder. Storage of the first active material 310 as pellets in a tank can simplify production and reduce production costs.

The first active material 310 may be an active material pelletized with a known binder. The binder may be polyvinylidene difluoride, polypropylene, polyethylene, or polyimide.

The first active material 310 may be a substance that is insoluble in the first liquid 110. Thus, there is provided a flow battery in which the first liquid 110 and the first electrode mediator 111 circulate, but the first active material 310 does not circulate.

In the flow battery 1000 according to the first embodiment, the first liquid 110 may be at least one selected from the group consisting of propylene carbonate (PC), ethylene carbonate (EC), γ-butyrolactone (GBL), dimethyl carbonate (DMC), ethyl methyl carbonate (EMC), fluoroethylene carbonate (FEC), and diethyl carbonate (DEC). The first liquid 110 may be an ether solvent. Examples of the ether solvent include tetrahydrofuran (THF), 2-methyltetrahydrofuran (2MeTHF), dimethoxyethane (DME), 1,3-dioxane (1,3DO), and 4-methyl-1,3-dioxane (4Me1,3DO).

In the flow battery 1000 according to the first embodiment, the first liquid 110 may be an electrolytic solution containing an electrolyte in a solvent that is usable in the first liquid 110. The electrolyte (salt) may be at least one selected from the group consisting of $LiBF_4$, $LiPF_6$, and $LiN(CF_3SO_2)_2$. The solvent may have a high dielectric constant, low reactivity with Li ions, and a potential window up to approximately 4 V.

The flow battery 1000 according to the first embodiment may include the first electrode 210 as a positive electrode and a second electrode 220 as a negative electrode.

If the second electrode 220 has a relatively high electric potential, the first electrode 210 may function as a negative electrode.

Thus, the first electrode 210 may be a negative electrode, and the second electrode 220 may be a positive electrode.

In the flow battery 1000 according to the first embodiment, for example, when the first liquid 110 comes into contact with the first electrode 210, the first electrode mediator 111 is oxidized or reduced on the first electrode 210.

The first electrode 210 may have a surface acting as a reaction field for the first electrode mediator 111.

In this case, the material of the first electrode 210 may be stable in the first liquid 110. The stable material in the first liquid 110 may be a material insoluble in the first liquid 110. The material of the first electrode 210 may also be resistant to an electrode reaction, that is, an electrochemical reaction. For example, the first electrode 210 may be formed of a metal or carbon. Examples of the metal include stainless steel, iron, copper, and nickel.

The first electrode 210 may have an increased surface area. Examples of such a structure with an increased surface area include meshes, nonwoven fabrics, surface-roughened sheets, and sintered porous bodies. Thus, the first electrode 210 may have an increased specific surface area. This can promote an oxidation or reduction reaction of the first electrode mediator 111.

The second electrode 220 may include a current collector and an active material on the current collector. Thus, for example, a high-capacity active material may be used. An active material of the second electrode 220 may be a compound that reversibly occludes and releases lithium ions.

The second electrode 220 may be made of lithium metal. The second electrode 220 made of lithium metal can easily control dissolution and precipitation as a metal positive electrode and achieve high capacity.

The flow battery 1000 according to the first embodiment may further include a separating unit 400.

The separating unit 400 separates the first electrode 210 and the first liquid 110 from the second electrode 220.

The separating unit 400 may be a microporous membrane and/or a porous body for use in known secondary batteries.

The separating unit 400 may be a porous film, such as glass paper, which is a nonwoven fabric with glass fibers woven in.

The separating unit 400 may be a membrane with ionic conductivity, such as a lithium-ion-conducting membrane. For example, the separating unit 400 may be an ion-exchange resin membrane or a solid electrolyte membrane. The ion-exchange resin membrane may be a cation-exchange membrane or an anion-exchange membrane.

The first circulation mechanism 510 circulates the first liquid 110 between the first electrode 210 and the first active material 310.

Such a structure can circulate the first electrode mediator 111 together with the first liquid 110 between the first electrode 210 and the first active material 310. This can efficiently promote an oxidation reaction and a reduction reaction between materials.

The first circulation mechanism 510 may include a pipe, a tank, a pump, and a valve, for example.

A specific example of the first circulation mechanism 510 may be a structure described later in a second embodiment.

<Charge-Discharge Process>

The charge-discharge process of the flow battery 1000 according to the first embodiment will be described below.

The charge-discharge process is specifically described with the following operation example.

In the operation example, the first electrode 210 is a positive electrode made of carbon black.

In the operation example, the first liquid 110 is an ether solution containing the first electrode mediator 111 dissolved therein.

In the operation example, the first electrode mediator 111 is a derivative represented by the general formula (1) according to the first embodiment (2-ethanediylidene-1,3-dithiole; hereinafter referred to as EBDT).

In the operation example, the first active material 310 is lithium manganese oxide ($LiMnO_2$).

In the operation example, the second electrode 220 is a negative electrode made of lithium metal.

[Charging Process]

First, a charge reaction will be described below.

A voltage is applied between the first electrode 210 and the second electrode 220 for charging.

Reaction on Negative Electrode

Upon application of a voltage, electrons are supplied to the negative electrode, that is, to the second electrode 220 from the outside of the flow battery. A reduction reaction occurs on the negative electrode, that is, on the second electrode 220. Thus, the negative electrode is charged.

For example, the following reaction occurs in the operation example.

$Li^+ + e^- \rightarrow Li$

Reaction on Positive Electrode

Upon application of a voltage, an oxidation reaction of the first electrode mediator 111 occurs on the positive electrode, that is, on the first electrode 210. Thus, the first electrode mediator 111 is oxidized on the surface of the first electrode 210. Thus, electrons are released from the first electrode 210 to the outside of the flow battery.

For example, the following reaction occurs in the operation example.

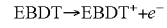
$EBDT \rightarrow EBDT^+ + e^-$

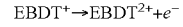
$EBDT^+ \rightarrow EBDT^{2+} + e^-$

The first circulation mechanism 510 transfers the first electrode mediator 111 oxidized on the first electrode 210 to the first active material 310. In other words, the first circulation mechanism 510 supplies the first electrode mediator 111 oxidized on the first electrode 210 to the first active material 310.

The first electrode mediator 111 oxidized on the first electrode 210 is reduced by the first active material 310. In other words, the first active material 310 is oxidized by the first electrode mediator 111. Thus, the first active material 310 releases lithium ions.

For example, the following reaction occurs in the operation example.

$$LiMnO_2 + EBDT^{2+} \rightarrow MnO_2 + Li^+ + EBDT^+$$

The first circulation mechanism 510 transfers the first electrode mediator 111 reduced by the first active material 310 to the first electrode 210. In other words, the first circulation mechanism 510 supplies the first electrode mediator 111 reduced by the first active material 310 to the first electrode 210.

Thus, the first electrode mediator 111 is oxidized on the surface of the first electrode 210.

For example, the following reaction occurs in the operation example.

$$EBDT^+ \rightarrow EBDT^{2+} + e^-$$

Part of lithium ions (Li$^+$) thus released may move to the second electrode 220 through the separating unit 400.

Thus, the first electrode mediator 111 is unchanged in the whole reaction including circulation.

Meanwhile, the first active material 310 separated from the first electrode 210 is charged.

Thus, EBDT$^+$ functions as a charge mediator on the first electrode 210, that is, as a first electrode side charge mediator.

In the fully charged state, the first liquid 110 contains EBDT$^{2+}$, and the first active material 310 is MnO$_2$. The charge potential depends on the oxidation potential with respect to the direction toward EBDT$^{2+}$.

The charge reaction can continue until the first active material 310 or the second electrode 220 reaches the fully charged state.

Second Embodiment

A second embodiment will be described below. The contents described in the first embodiment are appropriately omitted to avoid overlap.

Figure 2:
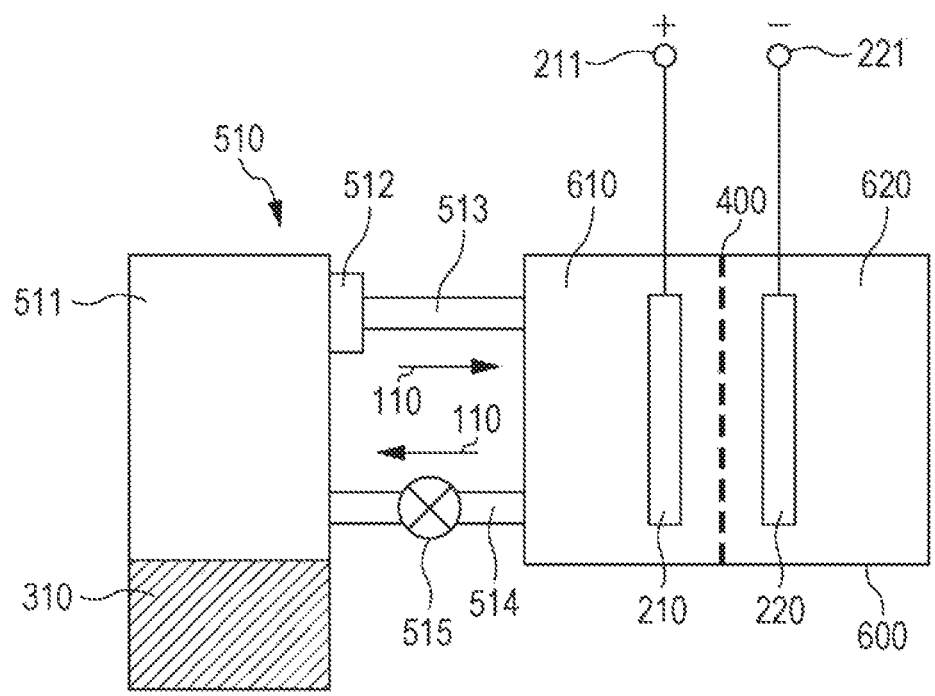
FIG. 2 is a schematic view of a flow battery according to the second embodiment.

FIG. 2 is a schematic view of a flow battery 2000 according to the second embodiment.

In addition to the components of the flow battery 1000 according to the first embodiment, the flow battery 2000 according to the second embodiment further includes the following components.

In the flow battery 2000 according to the second embodiment, the first circulation mechanism 510 includes a first container 511.

The first active material 310 and the first liquid 110 are housed in the first container 511.

The first circulation mechanism 510 circulates the first liquid 110 between the first electrode 210 and the first container 511.

Contact between the first active material 310 and the first liquid 110 in the first container 511 causes at least one of an oxidation reaction and a reduction reaction of the first electrode mediator 111 with the first active material 310.

In such a structure, the first liquid 110 can come into contact with the first active material 310 in the first container 511. This can increase the contact area between the first liquid 110 and the first active material 310, for example. This can also increase the contact time between the first liquid 110 and the first active material 310. This can efficiently promote an oxidation reaction and a reduction reaction of the first electrode mediator 111 with the first active material 310.

In the second embodiment, the first container 511 may be a tank.

The first container 511 may contain the first liquid 110, which contains the first electrode mediator 111 dissolved therein, in voids of the first active material 310.

As illustrated in FIG. 2, the flow battery 2000 according to the second embodiment may further include an electrochemical reaction unit 600, a positive-electrode terminal 211, and a negative-electrode terminal 221.

The electrochemical reaction unit 600 is divided into a positive-electrode chamber 610 and a negative-electrode chamber 620 by the separating unit 400.

An electrode acting as a positive electrode is disposed in the positive-electrode chamber 610. In FIG. 2, the first electrode 210 is disposed in the positive-electrode chamber 610.

The positive-electrode terminal 211 is coupled to the electrode acting as a positive electrode.

An electrode acting as a negative electrode is disposed in the negative-electrode chamber 620. In FIG. 2, the second electrode 220 is disposed in the negative-electrode chamber 620.

The negative-electrode terminal 221 is coupled to the electrode acting as a negative electrode.

The positive-electrode terminal 211 and the negative-electrode terminal 221 are coupled to a charge-discharge apparatus, for example. The charge-discharge apparatus applies a voltage between the positive-electrode terminal 211 and the negative-electrode terminal 221 or collects electric power generated between the positive-electrode terminal 211 and the negative-electrode terminal 221.

As illustrated in FIG. 2, in the flow battery 2000 according to the second embodiment, the first circulation mechanism 510 may include a pipe 514, a pipe 513, and a pump 515.

One end of the pipe 514 is coupled to the positive-electrode chamber 610 or the negative-electrode chamber 620 in which the first electrode 210 is to be disposed. In FIG. 2, one end of the pipe 514 is coupled to the positive-electrode chamber 610.

The other end of the pipe 514 is coupled to an inlet of the first container 511 for the first liquid 110.

One end of the pipe 513 is coupled to an outlet of the first container 511 for the first liquid 110.

The other end of the pipe 513 is coupled to the positive-electrode chamber 610 or the negative-electrode chamber 620 in which the first electrode 210 is to be disposed. In FIG. 2, the other end of the pipe 513 is coupled to the positive-electrode chamber 610.

The pump 515 is disposed on the pipe 514, for example. The pump 515 may be disposed on the pipe 513.

In the flow battery 2000 according to the second embodiment, the first circulation mechanism 510 may include a first transfer prevention unit 512.

The first transfer prevention unit 512 prevents the transfer of the first active material 310.

The first transfer prevention unit 512 is disposed on the path through which the first liquid 110 flows from the first container 511 to the first electrode 210. In FIG. 2, the first transfer prevention unit 512 is disposed on the pipe 513.

Such a structure can prevent the first active material 310 from flowing out of the first container 511 (for example, to the first electrode 210). Thus, the first active material 310 remains in the first container 511. Thus, the first active material 310 does not circulate in the flow battery. This can prevent clogging of a component in the first circulation mechanism 510 with the first active material 310. The component in the first circulation mechanism 510 is a pipe, for example. This can also prevent resistive loss due to the first active material 310 flowing to the first electrode 210.

The first transfer prevention unit 512 may be disposed on the joint between the first container 511 and the pipe 513.

For example, the first transfer prevention unit 512 is a filter that filters out the first active material 310. The filter may have openings smaller than the smallest particles of the first active material 310. The filter may be formed of a material that does not react with the first active material 310 and the first liquid 110. The filter may be a glass fiber filter paper, polypropylene nonwoven fabric, polyethylene nonwoven fabric, or a metal mesh that does not react with metallic lithium.

Such a structure can prevent the first active material 310 from flowing out of the first container 511 even when the flow of the first liquid 110 causes the flow of the first active material 310 in the first container 511.

In FIG. 2, the first liquid 110 in the first container 511 is supplied to the positive-electrode chamber 610 through the first transfer prevention unit 512 and through the pipe 513.

Thus, the first electrode mediator 111 dissolved in the first liquid 110 is oxidized or reduced on the first electrode 210.

Subsequently, the first liquid 110 containing the oxidized or reduced first electrode mediator 111 dissolved therein is supplied to the first container 511 through the pipe 514 and through the pump 515.

Thus, the first electrode mediator 111 dissolved in the first liquid 110 causes at least one of an oxidation reaction and a reduction reaction with the first active material 310.

The circulation of the first liquid 110 may be controlled with the pump 515. More specifically, the supply of the first liquid 110 may be started or stopped with the pump 515, or the amount of the first liquid 110 may be controlled with the pump 515.

The circulation of the first liquid 110 may be controlled by another means (for example, a valve) other than the pump 515.

In FIG. 2, by way of example, the first electrode 210 is a positive electrode, and the second electrode 220 is a negative electrode.

If the second electrode 220 has a relatively high electric potential, the first electrode 210 may function as a negative electrode.

Thus, the first electrode 210 may be a negative electrode, and the second electrode 220 may be a positive electrode.

Separated by the separating unit 400, the positive-electrode chamber 610 and the negative-electrode chamber 620 may contain different electrolytic solutions and/or solvents.

The positive-electrode chamber 610 and the negative-electrode chamber 620 may contain the same electrolytic solution and/or solvent.

A flow battery according to the present disclosure can be used for charge storage devices and charge storage systems, for example.

What is claimed is:

1. A flow battery comprising:
   a liquid including a redox mediator;
   an electrode at least partially immersed in the liquid;
   an active material at least partially immersed in the liquid; and
   a circulator that circulates the liquid between the electrode and the active material,
   wherein the redox mediator includes a compound represented by the following general formula (1):

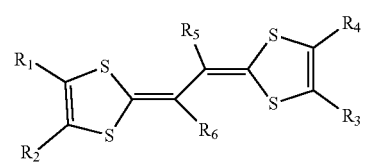

(1)

where $R_1$ to $R_6$ each independently denote a hydrogen atom, a chain saturated hydrocarbon group, a chain unsaturated hydrocarbon group, a cyclic saturated hydrocarbon group, or a cyclic unsaturated hydrocarbon group, $R_1$ to $R_6$ may each independently include at least one selected from the group consisting of an oxygen atom, a nitrogen atom, a sulfur atom, and a silicon atom, and the compound represented by the general formula (1) is a compound represented by the following general formula (2):

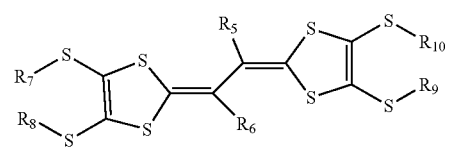

(2)

where $R_5$ to $R_{10}$ each independently denote a hydrogen atom, a chain saturated hydrocarbon group, a chain unsaturated hydrocarbon group, a cyclic saturated hydrocarbon group, or a cyclic unsaturated hydrocarbon group, and $R_5$ to $R_{10}$ may each independently include at least one selected from the group consisting of an oxygen atom, a nitrogen atom, a sulfur atom, and a silicon atom.

2. The flow battery according to claim 1, wherein $R_1$, $R_2$, $R_3$, and $R_4$ each independently denote a hydrogen atom, a straight-chain saturated hydrocarbon group, or a straight-chain unsaturated hydrocarbon group, and the straight-chain saturated hydrocarbon group and the straight-chain unsaturated hydrocarbon group may each independently include at least one sulfur atom.

3. The flow battery according to claim 1, wherein $R_1$, $R_2$, $R_3$, and $R_4$ each independently denote a hydrogen atom or $SCH_3$.

4. The flow battery according to claim 1, wherein $R_5$ and $R_6$ each independently denote a hydrogen atom or an aromatic group.

5. A flow battery comprising:
   a liquid including a redox mediator;
   an electrode at least partially immersed in the liquid;
   an active material at least partially immersed in the liquid; and
   a circulator that circulates the liquid between the electrode and the active material,
   wherein the redox mediator includes a compound represented by the following general formula (1):

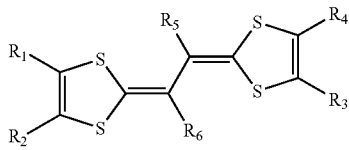

(1)

where $R_1$ to $R_6$ each independently denote a hydrogen atom, a chain saturated hydrocarbon group, a chain unsaturated hydrocarbon group, a cyclic saturated hydrocarbon group, or a cyclic unsaturated hydrocarbon group, $R_1$ to $R_6$ may each independently include at least one selected from the group consisting of an oxygen atom, a nitrogen atom, a sulfur atom, and a silicon atom, and the compound represented by the general formula (1) is a compound represented by the following formula (3)

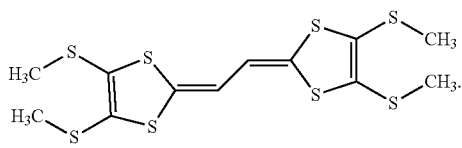

(3)

6. A flow battery comprising:

a liquid including a redox mediator;

an electrode at least partially immersed in the liquid;

an active material at least partially immersed in the liquid; and a circulator that circulates the liquid between the electrode and the active material, wherein the redox mediator includes a compound represented by the following general formula (1):

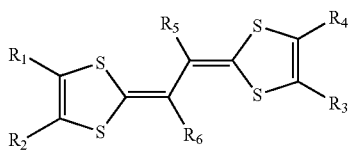

(1)

where $R_1$ to $R_6$ each independently denote a hydrogen atom, a chain saturated hydrocarbon group, a chain unsaturated hydrocarbon group, a cyclic saturated hydrocarbon group, or a cyclic unsaturated hydrocarbon group, $R_1$ to $R_6$ may each independently include at least one selected from the group consisting of an oxygen atom, a nitrogen atom, a sulfur atom, and a silicon atom, and the compound represented by the general formula (1) is a compound represented by the following formula (4)

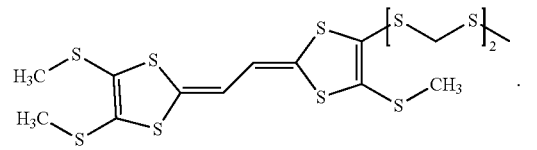

(4)

7. The flow battery according to claim 1, wherein the circulator includes a container, the active material and at least part of the liquid are housed in the container, and are in contact with each other to cause at least either an oxidation reaction or a reduction reaction between the active material and the redox mediator, and the circulator circulates the liquid between the electrode and the container.

8. The flow battery according to claim 5, wherein the circulator includes a container, the active material and at least part of the liquid are housed in the container, and are in contact with each other to cause at least either an oxidation reaction or a reduction reaction between the active material and the redox mediator, and the circulator circulates the liquid between the electrode and the container.

9. The flow battery according to claim 6, wherein the circulator includes a container, the active material and at least part of the liquid are housed in the container, and are in contact with each other to cause at least either an oxidation reaction or a reduction reaction between the active material and the redox mediator, and the circulator circulates the liquid between the electrode and the container.

10. The flow battery according to claim 1, wherein the circulator includes a transfer prevention filter unit that prevents transfer of the active material, and the transfer prevention filter unit is disposed on a path through which the liquid flows from the container to the electrode.

11. The flow battery according to claim 5, wherein the circulator includes a transfer prevention filter unit that prevents transfer of the active material, and the transfer prevention filter unit is disposed on a path through which the liquid flows from the container to the electrode.

12. The flow battery according to claim 6, wherein the circulator includes a transfer prevention filter unit that prevents transfer of the active material, and the transfer prevention filter unit is disposed on a path through which the liquid flows from the container to the electrode.

* * * * *